US012499804B2

(12) United States Patent
Kiriyama et al.

(10) Patent No.: US 12,499,804 B2
(45) Date of Patent: Dec. 16, 2025

(54) LIGHT MEASURING APPARATUS, LIGHT MEASURING SYSTEM, LIGHT MEASUREMENT METHOD, DISPLAY ADJUSTMENT SYSTEM, AND ADJUSTMENT METHOD

(71) Applicant: Konica Minolta, Inc., Tokyo (JP)

(72) Inventors: Tomohiro Kiriyama, Kofu (JP); Tomohiro Murata, Sakai (JP); Tomohiro Fukamizu, Sakai (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/402,026

(22) Filed: Jan. 2, 2024

(65) Prior Publication Data

US 2024/0242653 A1 Jul. 18, 2024

(30) Foreign Application Priority Data

Jan. 13, 2023 (JP) ................................ 2023-003878

(51) Int. Cl.
*G09G 3/20* (2006.01)

(52) U.S. Cl.
CPC ... *G09G 3/2003* (2013.01); *G09G 2320/0673* (2013.01); *G09G 2320/0693* (2013.01); *G09G 2360/145* (2013.01)

(58) Field of Classification Search
CPC ......... G09G 3/2003; G09G 2320/0673; G09G 2320/0693; G09G 2360/145
USPC ........................................................ 345/207
See application file for complete search history.

(56) References Cited

U.S. PATENT DOCUMENTS

| | | | | |
|---|---|---|---|---|
| 2014/0139571 | A1* | 5/2014 | Albrecht | G09G 5/02 345/694 |
| 2016/0086529 | A1* | 3/2016 | Myers | G09G 3/3696 345/691 |
| 2020/0043201 | A1* | 2/2020 | Tanaka | H04N 17/04 |
| 2020/0380907 | A1* | 12/2020 | Marcu | G09G 3/2003 |
| 2022/0165198 | A1* | 5/2022 | Bogdanowicz | G06F 3/1446 |
| 2023/0136688 | A1* | 5/2023 | Leerentveld | G09G 3/3233 345/207 |
| 2023/0236429 | A1* | 7/2023 | Buckley | G06T 7/337 345/7 |
| 2023/0351982 | A1* | 11/2023 | Yi | G09G 3/006 |

FOREIGN PATENT DOCUMENTS

| | | | | |
|---|---|---|---|---|
| JP | 2009168466 A | | 7/2009 | |
| JP | 5589299 B2 | | 8/2014 | |
| WO | WO-2017129265 A1 | * | 8/2017 | G09G 5/06 |

* cited by examiner

*Primary Examiner* — Kwin Xie
(74) *Attorney, Agent, or Firm* — BUCHANAN INGERSOLL & ROONEY PC

(57) ABSTRACT

A light measuring apparatus includes a light receiver that receives light from a measurement target capable of emitting light, a memory that stores in advance calibration data corresponding to a plurality of gradations corresponding to a plurality of light emission modes of the measurement target for each color of light emitted from the measurement target, and a hardware processor that calculates light emission information including a measurement target parameter of the light received by the light receiver using a light intensity signal received by the light receiver and calibration data corresponding to a light emission state of the measurement target.

29 Claims, 14 Drawing Sheets

FIG. 5

| DRIVE FREQUENCY | Gamma Mode | W | | R | | G | | B | |
|---|---|---|---|---|---|---|---|---|---|
| | | REFERENCE VALUE | CALIBRATION TARGET MEASURED VALUE | REFERENCE VALUE | CALIBRATION TARGET MEASURED VALUE | REFERENCE VALUE | CALIBRATION TARGET MEASURED VALUE | REFERENCE VALUE | CALIBRATION TARGET MEASURED VALUE |
| 60Hz | Mode1 (HIGH LUMINANCE) | Lvxy | Lvxy | Lvxy | Lvxy | Lvxy | Lvxy | Lvxy | Lvxy |
| | Mode2 | Lvxy | Lvxy | Lvxy | Lvxy | Lvxy | Lvxy | Lvxy | Lvxy |
| | Mode3 | Lvxy | Lvxy | Lvxy | Lvxy | Lvxy | Lvxy | Lvxy | Lvxy |
| | Mode4 (LOW LUMINANCE) | Lvxy | Lvxy | Lvxy | Lvxy | Lvxy | Lvxy | Lvxy | Lvxy |

| | | White | | | Red | | | Green | | | Blue | | |
|---|---|---|---|---|---|---|---|---|---|---|---|---|---|
| Gamma Mode | Tone | x | y | Lv [cd/m²] | x | y | Lv [cd/m²] | x | y | Lv [cd/m²] | x | y | Lv [cd/m²] |
| Mode1 | 0 | 0.252956 | 0.230274 | 0.218267 | 0.253277 | 0.230097 | 0.219521 | 0.253355 | 0.230197 | 0.218586 | 0.253917 | 0.2313 | 0.219506 |
| | 15 | 0.288904 | 0.287969 | 0.686596 | 0.357501 | 0.256957 | 0.331261 | 0.277718 | 0.369397 | 0.547251 | 0.216777 | 0.165687 | 0.251074 |
| | 31 | 0.306065 | 0.316031 | 2.712553 | 0.516698 | 0.297386 | 0.828443 | 0.305396 | 0.524323 | 2.070934 | 0.17554 | 0.093076 | 0.423533 |
| | 47 | 0.309828 | 0.322323 | 6.573581 | 0.591539 | 0.316357 | 1.880607 | 0.314942 | 0.577083 | 5.180187 | 0.16327 | 0.071108 | 0.800079 |
| | 63 | 0.311192 | 0.324621 | 12.82945 | 0.617989 | 0.323363 | 3.255082 | 0.318096 | 0.595333 | 9.67339 | 0.159599 | 0.064851 | 1.267094 |
| | 79 | 0.311634 | 0.325423 | 20.33509 | 0.631209 | 0.326624 | 5.003469 | 0.319631 | 0.603522 | 15.38101 | 0.158004 | 0.061858 | 1.860892 |
| | 95 | 0.31185 | 0.325767 | 30.62325 | 0.639451 | 0.328739 | 7.451427 | 0.320554 | 0.608524 | 23.85722 | 0.156852 | 0.059964 | 2.732752 |
| | 111 | 0.311939 | 0.325851 | 43.75226 | 0.645111 | 0.330301 | 11.35455 | 0.321122 | 0.611352 | 34.24353 | 0.156177 | 0.058694 | 4.082483 |
| | 127 | 0.311921 | 0.325751 | 60.85702 | 0.648208 | 0.331076 | 15.67351 | 0.321313 | 0.613136 | 46.27169 | 0.155829 | 0.058012 | 5.561992 |
| | 143 | 0.311892 | 0.325548 | 80.16375 | 0.650117 | 0.331582 | 20.66782 | 0.321533 | 0.614292 | 61.80514 | 0.155552 | 0.05756 | 7.294612 |
| | 159 | 0.311836 | 0.325316 | 101.5659 | 0.651587 | 0.331945 | 26.95263 | 0.321699 | 0.615111 | 80.34768 | 0.155367 | 0.057191 | 9.609302 |
| | 175 | 0.311726 | 0.324996 | 129.7367 | 0.652554 | 0.332225 | 34.42252 | 0.321787 | 0.615729 | 102.0956 | 0.155276 | 0.056921 | 12.06222 |
| | 191 | 0.311566 | 0.324578 | 160.0824 | 0.653211 | 0.332399 | 42.99979 | 0.321838 | 0.616143 | 125.9386 | 0.155174 | 0.056581 | 15.37017 |
| | 207 | 0.311265 | 0.32401 | 194.716 | 0.653604 | 0.332434 | 54.51243 | 0.321829 | 0.616441 | 159.4406 | 0.155125 | 0.056071 | 19.14284 |
| | 223 | 0.310737 | 0.323041 | 232.9626 | 0.653602 | 0.332433 | 54.52542 | 0.321432 | 0.616814 | 194.4189 | 0.15526 | 0.055343 | 21.92046 |
| | 239 | 0.308342 | 0.319571 | 288.3348 | 0.653587 | 0.33243 | 54.52387 | 0.32099 | 0.616882 | 213.1669 | 0.15529 | 0.055343 | 21.90906 |
| | 255 | 0.308022 | 0.31913 | 291.9542 | 0.653589 | 0.332447 | 54.50044 | 0.320997 | 0.616904 | 213.2424 | 0.155293 | 0.055336 | 21.90741 |

| | | White | | | Red | | | Green | | | Blue | | |
|---|---|---|---|---|---|---|---|---|---|---|---|---|---|
| Gamma Mode | Tone | x | y | Lv [cd/m²] | x | y | Lv [cd/m²] | x | y | Lv [cd/m²] | x | y | Lv [cd/m²] |
| Mode1 | 0 | 0.252956 | 0.230274 | 0.22045 | 0.253277 | 0.230097 | 0.221716 | 0.253355 | 0.230197 | 0.220772 | 0.253917 | 0.2313 | 0.2217015 |
| | 15 | 0.288904 | 0.287969 | 0.693462 | 0.357501 | 0.256957 | 0.334573 | 0.277718 | 0.369397 | 0.552723 | 0.216777 | 0.165687 | 0.2535849 |
| | 31 | 0.306065 | 0.316031 | 2.739678 | 0.516698 | 0.297386 | 0.836727 | 0.305396 | 0.524323 | 2.091643 | 0.17554 | 0.093076 | 0.4277685 |
| | 47 | 0.309828 | 0.322323 | 6.639317 | 0.591539 | 0.316357 | 1.899413 | 0.314942 | 0.577083 | 5.231989 | 0.16327 | 0.071108 | 0.8080798 |
| | 63 | 0.311192 | 0.324621 | 12.95775 | 0.617989 | 0.323363 | 3.287632 | 0.318096 | 0.595333 | 9.770124 | 0.159599 | 0.064851 | 1.2797651 |
| | 79 | 0.311634 | 0.325423 | 20.53844 | 0.631209 | 0.326624 | 5.053504 | 0.319631 | 0.603522 | 15.53482 | 0.158004 | 0.061858 | 1.8795011 |
| | 95 | 0.31185 | 0.325767 | 30.92948 | 0.639451 | 0.328739 | 7.525941 | 0.320554 | 0.608524 | 24.0958 | 0.156852 | 0.059964 | 2.7600799 |
| | 111 | 0.311939 | 0.325851 | 44.18978 | 0.645111 | 0.330301 | 11.4681 | 0.321122 | 0.611352 | 34.58596 | 0.156177 | 0.058694 | 4.1233082 |
| | 127 | 0.311921 | 0.325751 | 61.46559 | 0.648208 | 0.331076 | 15.83025 | 0.321313 | 0.613136 | 46.7344 | 0.155829 | 0.058012 | 5.6176117 |
| | 143 | 0.311892 | 0.325548 | 80.96539 | 0.650117 | 0.331582 | 20.8745 | 0.321533 | 0.614292 | 62.42319 | 0.155552 | 0.05756 | 7.3675578 |
| | 159 | 0.311836 | 0.325316 | 102.5816 | 0.651587 | 0.331945 | 27.22216 | 0.321699 | 0.615111 | 81.15116 | 0.155367 | 0.057191 | 9.7053954 |
| | 175 | 0.311726 | 0.324996 | 131.034 | 0.652554 | 0.332225 | 34.76674 | 0.321787 | 0.615729 | 103.1166 | 0.155276 | 0.056921 | 12.182839 |
| | 191 | 0.311566 | 0.324578 | 161.6832 | 0.653211 | 0.332399 | 43.42978 | 0.321838 | 0.616143 | 127.198 | 0.155174 | 0.056581 | 15.523875 |
| | 207 | 0.311265 | 0.32401 | 196.6632 | 0.653604 | 0.332434 | 55.05756 | 0.321829 | 0.616441 | 161.035 | 0.155125 | 0.056071 | 19.334271 |
| | 223 | 0.310737 | 0.323041 | 235.2922 | 0.653602 | 0.332433 | 55.07068 | 0.321432 | 0.616814 | 196.363 | 0.15526 | 0.055343 | 22.139667 |
| | 239 | 0.308342 | 0.319571 | 291.2182 | 0.653587 | 0.33243 | 55.06911 | 0.32099 | 0.616882 | 215.2985 | 0.15529 | 0.055343 | 22.128154 |
| | 255 | 0.308022 | 0.31913 | 294.8737 | 0.653589 | 0.332447 | 55.04544 | 0.320997 | 0.616904 | 215.3748 | 0.155293 | 0.055336 | 22.126484 |

FIG. 6

| DRIVE FREQUENCY | Gamma Mode | W | R | G | B | |
|---|---|---|---|---|---|---|
| | | REFERENCE VALUE | REFERENCE VALUE | REFERENCE VALUE | REFERENCE VALUE | MATRIX CALIBRATION COEFFICIENT |
| 60Hz | Mode1 (HIGH LUMINANCE) | Lvxy | Lvxy | Lvxy | Lvxy | MATRIX |
| | Mode2 | Lvxy | Lvxy | Lvxy | Lvxy | MATRIX |
| | Mode3 | Lvxy | Lvxy | Lvxy | Lvxy | MATRIX |
| | Mode4 (LOW LUMINANCE) | Lvxy | Lvxy | Lvxy | Lvxy | MATRIX |

| | | REFERENCE VALUES (MEASURED BY REFERENCE MEASURER) | | | | | | | | | | | | USER CALIBRATION COEFFICIENTS (COEFFICIENTS FOR CALIBRATING DIFFERENCES FROM REFERENCE MEASURER) | | | | | | | | |
|---|---|---|---|---|---|---|---|---|---|---|---|---|---|---|---|---|---|---|---|---|---|---|
| | | White | | | Red | | | Green | | | Blue | | | Matrix | | | | | | | | |
| Gamma Mode | Tone | x | y | Lv [cd/m²] | x | y | Lv [cd/m²] | x | y | Lv [cd/m²] | x | y | Lv [cd/m²] | M11 | M12 | M13 | M21 | M22 | M23 | M31 | M32 | M33 |
| Mode1 | 0 | 0.252956 | 0.230274 | 0.218267 | 0.253277 | 0.230097 | 0.219521 | 0.253355 | 0.230197 | 0.218586 | 0.253917 | 0.2313 | 0.219506 | 0.990099 | -1.4E-12 | 5.68E-14 | -1E-12 | 0.990099 | 1.49E-13 | -2E-12 | -9.1E-13 | 0.990099 |
| | 15 | 0.288904 | 0.287969 | 0.686596 | 0.357501 | 0.256957 | 0.331261 | 0.277718 | 0.369397 | 0.547251 | 0.216777 | 0.165687 | 0.251074 | 0.990099 | -2.2E-16 | -2.2E-16 | 1.11E-16 | 0.990099 | -2.2E-16 | -4.4E-16 | -2.2E-16 | 0.990099 |
| | 31 | 0.306065 | 0.316031 | 2.712553 | 0.516698 | 0.297386 | 0.828443 | 0.305396 | 0.524323 | 2.070934 | 0.17554 | 0.093076 | 0.423533 | 0.990099 | 1.77E-16 | -2.8E-17 | -2E-16 | 0.990099 | 2.78E-17 | -1.4E-17 | 0 | 0.990099 |
| | 47 | 0.309828 | 0.322323 | 6.573581 | 0.591539 | 0.316357 | 1.880607 | 0.314942 | 0.577083 | 5.180187 | 0.16327 | 0.071108 | 0.800079 | 0.990099 | 9.02E-17 | 0 | 6.07E-17 | 0.990099 | -1.4E-17 | 5.55E-17 | -2.8E-17 | 0.990099 |
| | 63 | 0.311192 | 0.324621 | 12.82945 | 0.617989 | 0.323363 | 3.255082 | 0.318096 | 0.595333 | 9.67339 | 0.159599 | 0.064851 | 1.267094 | 0.990099 | 5.2E-17 | -2.8E-17 | -1.4E-16 | 0.990099 | -1.4E-17 | -5.9E-17 | -2.8E-17 | 0.990099 |
| | 79 | 0.311634 | 0.325423 | 20.33509 | 0.631209 | 0.326624 | 5.003469 | 0.319631 | 0.603522 | 15.38101 | 0.158004 | 0.061858 | 1.860892 | 0.990099 | 7.98E-17 | -2.8E-17 | -1E-16 | 0.990099 | 0 | -1.1E-17 | -2.8E-17 | 0.990099 |
| | 95 | 0.31185 | 0.325767 | 30.62325 | 0.639451 | 0.328739 | 7.451427 | 0.320554 | 0.608524 | 23.85722 | 0.156852 | 0.059964 | 2.732752 | 0.990099 | -6.9E-17 | -2.8E-17 | 4.05E-17 | 0.990099 | 0 | 2.08E-17 | -2.8E-17 | 0.990099 |
| | 111 | 0.311939 | 0.325851 | 43.75226 | 0.645111 | 0.330301 | 11.35455 | 0.321122 | 0.611352 | 34.24353 | 0.156177 | 0.058694 | 4.082483 | 0.990099 | -2.4E-17 | 0 | 2.59E-16 | 0.990099 | -1.4E-17 | 0 | 0 | 0.990099 |
| | 127 | 0.311921 | 0.325751 | 60.85702 | 0.648208 | 0.331076 | 15.67351 | 0.321313 | 0.613136 | 46.27169 | 0.155829 | 0.058012 | 5.561992 | 0.990099 | 1.42E-16 | 2.78E-17 | -1.1E-16 | 0.990099 | 2.78E-17 | -6.9E-18 | 1.39E-17 | 0.990099 |
| | 143 | 0.311892 | 0.325548 | 80.16375 | 0.650117 | 0.331582 | 20.66782 | 0.321533 | 0.614292 | 61.80514 | 0.155552 | 0.05756 | 7.294612 | 0.990099 | -9.7E-17 | -2.8E-17 | 6.72E-17 | 0.990099 | 0 | 6.94E-18 | -1.4E-17 | 0.990099 |
| | 159 | 0.311836 | 0.325316 | 101.5659 | 0.651587 | 0.331945 | 26.95263 | 0.321699 | 0.615111 | 80.34768 | 0.155367 | 0.057191 | 9.609302 | 0.990099 | -6.6E-17 | 0 | 1.48E-16 | 0.990099 | 0 | 0 | -1.4E-17 | 0.990099 |
| | 175 | 0.311726 | 0.324996 | 129.7367 | 0.652554 | 0.332225 | 34.42252 | 0.321787 | 0.615729 | 102.0956 | 0.155276 | 0.056921 | 12.06222 | 0.990099 | -1.1E-16 | 2.78E-17 | -8.4E-17 | 0.990099 | 1.39E-17 | 0 | -1.4E-17 | 0.990099 |
| | 191 | 0.311566 | 0.324578 | 160.0824 | 0.653211 | 0.332399 | 42.99979 | 0.321838 | 0.616143 | 125.9386 | 0.155174 | 0.056581 | 15.37017 | 0.990099 | -3.8E-17 | 2.78E-17 | 2.2E-16 | 0.990099 | 0 | 6.94E-18 | 0 | 0.990099 |
| | 207 | 0.311265 | 0.32401 | 194.716 | 0.653604 | 0.332434 | 54.51243 | 0.321829 | 0.616441 | 159.4406 | 0.155125 | 0.056071 | 19.14284 | 0.990099 | -2.4E-17 | -2.8E-17 | -1.8E-16 | 0.990099 | 0 | -1.4E-17 | 4.16E-17 | 0.990099 |
| | 223 | 0.310737 | 0.323041 | 232.9626 | 0.653602 | 0.332433 | 54.52542 | 0.321432 | 0.616814 | 194.4189 | 0.15526 | 0.055343 | 21.92046 | 0.990099 | 1.42E-16 | -2.8E-17 | -1.6E-16 | 0.990099 | 2.78E-17 | 6.94E-18 | 4.16E-17 | 0.990099 |
| | 239 | 0.308342 | 0.319571 | 288.3348 | 0.653587 | 0.33243 | 54.52387 | 0.32099 | 0.616882 | 213.1669 | 0.15529 | 0.055343 | 21.90906 | 0.990099 | 1.25E-16 | 0 | 0.006701 | 0.984893 | -0.00108 | 6.94E-18 | 1.39E-17 | 0.990099 |
| | 255 | 0.308022 | 0.31913 | 291.9542 | 0.653589 | 0.332447 | 54.50044 | 0.320997 | 0.616904 | 213.2424 | 0.155293 | 0.055336 | 21.90741 | 0.94388 | -0.02975 | 0.043992 | -3.6E-17 | 1 | 1.39E-17 | 2.08E-17 | 0 | 0.990099 |

LIGHT MEASURING APPARATUS, LIGHT MEASURING SYSTEM, LIGHT MEASUREMENT METHOD, DISPLAY ADJUSTMENT SYSTEM, AND ADJUSTMENT METHOD

CROSS-REFERENCE TO RELATED APPLICATION

The disclosure of Japanese Patent Application No. 2023-003878 filed on Jan. 13, 2023, including description, claims, drawings, and abstract, is incorporated herein by reference in its entirety.

BACKGROUND

1. Technological Field

The present invention relates to a light measuring apparatus, a light measuring system, a light measurement method, a display adjustment system using the light measuring apparatus, and an adjustment method, which are capable of measuring measurement target parameters such as luminance and chromaticity of a measurement target such as a display.

2. Description of the Related Art

For example, in a process of manufacturing a display which is a measurement target capable of emitting light, luminance which is one of parameters relating to a light emission state of the display is measured by a light measuring apparatus such as a color analyzer, and gamma adjustment of the display based on the measured luminance is performed. In addition, in a case where an error of measurement data is large, since the gamma adjustment cannot be performed with high accuracy, calibration is usually performed using calibration data in order to eliminate the error of the measurement data.

With regard to the calibration of such measurement data, in the related art, calibration data is created only for one luminance level at a specific panel drive frequency (for example, 60 Hz), and the created calibration data is applied to all luminance, a gamma curve, and a light emission drive frequency of the display to perform measurement.

In addition, Japanese Unexamined Patent Application Publication No. 2009-168466 and Japanese Patent Publication No. 5589299 disclose techniques for creating calibration data based on gradation information acquired from the display side.

However, in recent years, there has been an increase in the number of displays capable of emitting light in a plurality of light emission modes, and there has been an increase in the number of gamma adjustment conditions in gamma adjustment of such displays. For this reason, the use of only calibration data for luminance at a specific panel drive frequency as in the related art, or the use of calibration data based on gradation information as described in Japanese Unexamined Patent Application Publication No. 2009-168466 and Japanese Patent Publication No. 5589299, has the following problems. That is, when a deviation from a condition at the time of creating calibration data is large, the error of the measurement data becomes large. For this reason, there is a problem that sufficient measurement accuracy (accuracy) for required luminance, a gamma curve, and panel driving cannot be secured.

SUMMARY

An object of the present invention is to provide a light measuring apparatus, a light measuring system, a light measurement method, a display adjustment system, and an adjustment method capable of measuring measurement target parameters such as luminance and chromaticity measured from a measurement target capable of emitting light such as a display with high accuracy even under different light emission conditions.

A first aspect of the present invention relates to a light measuring apparatus including:

a light receiver that receives light from a measurement target capable of emitting light;

a memory that stores in advance calibration data corresponding to a plurality of gradations corresponding to a plurality of light emission modes of the measurement target for each color of light emitted from the measurement target: and a hardware processor that calculates light emission information including a measurement target parameter of the light received by the light receiver using a light intensity signal received by the light receiver and calibration data corresponding to a light emission state of the measurement target.

A second aspect of the present invention relates to a light measuring system including:

a light receiver that receives light from a measurement target capable of emitting light; and an information processing apparatus, in which the information processing apparatus includes a memory that stores in advance calibration data corresponding to a plurality of gradations corresponding to a plurality of light emission modes of the measurement target for each color of light emitted from the measurement target, and a hardware processor that calculates light emission information including a measurement target parameter of the light received by the light receiver using a light intensity signal received by the light receiver and calibration data corresponding to a light emission state of the measurement target.

A third aspect of the present invention relates to a light measurement method including:

receiving light by a light receiver from a measurement target capable of emitting light;

storing in advance calibration data corresponding to a plurality of gradations corresponding to a plurality of light emission modes of the measurement target in a memory for each color of light emitted from the measurement target: and calculating light emission information including a measurement target parameter of the received light using a light intensity signal received by the light receiver and calibration data corresponding to a light emission state of the measurement target.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 5 is a diagram illustrating an example of a lookup table holding user calibration data;

FIG. 6 is a diagram illustrating another example of the lookup table holding the user calibration data;

DETAILED DESCRIPTION OF EMBODIMENTS

Hereinafter, one or more embodiments of the present invention will be described with reference to the drawings. However, the scope of the invention is not limited to the disclosed embodiments.

Figure 1:
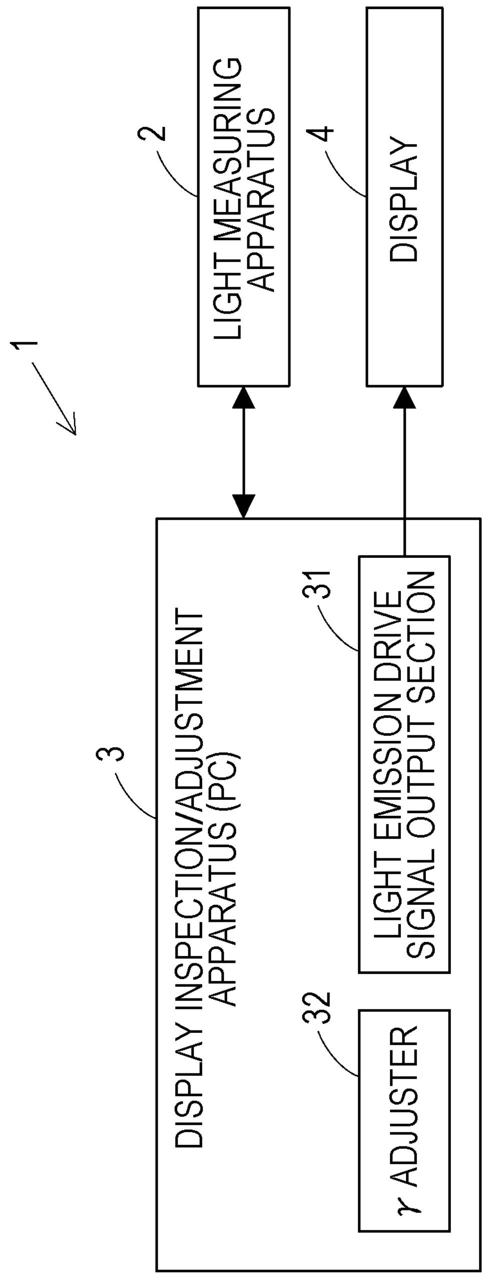
FIG. 1 is a block diagram illustrating an overall configuration of a display inspection/adjustment system according to an embodiment of the present invention.

FIG. 1 is a block diagram illustrating an overall configuration of a display inspection/adjustment system 1 according to an embodiment of the present invention. The display inspection/adjustment system 1 includes a light measuring apparatus 2 and a display inspection/adjustment apparatus 3 constituted by an information processing apparatus such as a personal computer (PC).

The light measuring apparatus 2 is, for example, an apparatus called a color analyzer, and can measure luminance, chromaticity, and the like, which are measurement target parameters of a measurement target. In the present embodiment, the measurement target is a display 4 provided with a plurality of light emitters such as LEDs. In addition, although a case where the light measuring apparatus 2 measures luminance in order to perform gamma adjustment of the display 4 will be described, the same applies to measurement of chromaticity.

Figure 2:
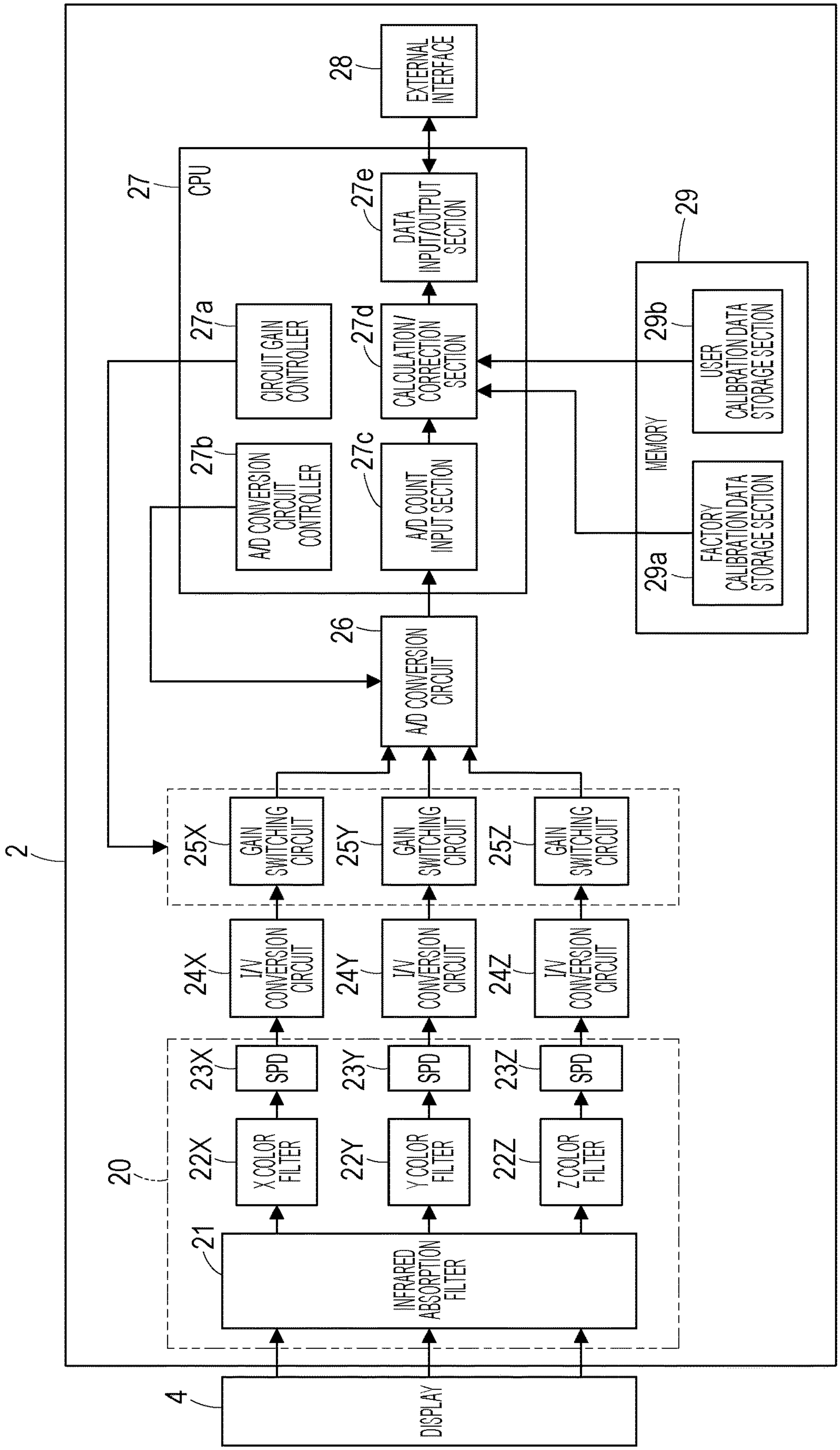
FIG. 2 is a block diagram illustrating an electrical configuration of a light measuring apparatus.

FIG. 2 is a block diagram illustrating an electrical configuration of the light measuring apparatus 2.

The light measuring apparatus 2 includes a light receiving sensor (corresponding to light receiving means) 20 formed of a light receiving element. Light emitted from the display 4 and incident on a light receiving window of the light receiving sensor 20 is transmitted through an infrared absorption filter 21, then passes through each of X, Y, and Z color filters 22X, 22Y, and 22Z, and thus are spectrally separated. Then, the light of respective wavelengths is photoelectrically converted by silicon photodiodes 23X, 23Y, and 23Z.

Signals obtained as currents in the silicon photodiodes 23X, 23Y, and 23Z are converted into voltage signals by current-to-voltage conversion circuits (I/V conversion circuits) 24X, 24Y, and 24Z, and are input to an A/D conversion circuit 26 through gain switching circuits 25X, 25Y, and 25Z. The gain switching circuits 25X, 25Y, and 25Z are provided to adapt the voltage signals to a dynamic range of the A/D conversion circuit 26. A circuit gain controller 27*a* of a CPU 27 controls the gains of the gain switching circuits 25X, 25Y, and 25Z based on a result of the analog-to-digital conversion of the voltage signals by the single A/D conversion circuit 26 in a predetermined period through a multiplex operation. An A/D conversion circuit controller 27*b* of the CPU 27 controls sampling of the A/D conversion circuit 26. In this way, the I/V conversion circuits 24X, 24Y, and 24Z, the gain switching circuits 25X, 25Y, and 25Z, and the A/D conversion circuit 26 constitute a signal conversion section that converts analog signals from the sensor 20 into digital signals to be processed by the CPU 27 serving as a calculator.

The CPU 27 is a calculator that calculates the signals input from the signal conversion section and obtains a luminance value and a chromaticity value such as an Lv value, an x value, and a y value. In addition to the circuit gain controller 27*a* and the A/D conversion circuit controller 27*b*, the CPU 27 includes an A/D count input section 27*c* to which count values of X, Y, and Z from the A/D conversion circuit 26 are input. The CPU 27 further includes a calculation/correction section 27*d* that obtains a luminance value and a chromaticity value by performing calculation and correction on the count values, and a data input/output section that communicates with the display inspection/adjustment apparatus 3 and the like via an interface section 28 that is a communication interface. The data input/output section 27*e* corresponds to light emission mode signal input means and calibration data information output means.

In the present embodiment, in a process of obtaining a luminance value and a chromaticity value, the calculation/correction section 27*d* of the CPU 27 obtains the luminance value and the chromaticity value from the display inspection/adjustment apparatus 3 via the interface section 28. The calculation/correction section 27*d* further refers to calibration data stored in a factory calibration data storage section 29*a* and a user calibration data storage section 29*b* of a memory 19 based on a light emission mode signal of the display 4 input from the data input/output section 27*e*. The calculation/correction section 27*d* further performs interpolation calculation or the like as necessary to correct an actual measured value. In the gamma adjustment of the display 4, the data input/output section 27*e* not only receives the light emission mode signal from the display inspection/adjustment apparatus 3 via the interface section 28 but also outputs a correction result as measurement information to the display inspection/adjustment apparatus 3. The data input/output section 27*e* further receives a measurement start instruction and the like from the display inspection/adjustment apparatus 3.

The factory calibration data storage section 29*a* stores factory calibration data, and the user calibration data storage section 29*b* stores user calibration data. The factory calibration data is calibration data set based on a reference light source in a factory at the time of shipment of the light measuring apparatus 2.

The user calibration data is calibration data set by user calibration. The user calibration refers to setting a user-specific correction coefficient in a calibration channel of the light measuring apparatus 2 by measuring a color of the reference light source set by a user, for example, a color of a predetermined display and setting a calibration value in the light measuring apparatus 2. The calibration data may be color system data (Lv/x/y, XYZ, etc.) for white (W), red (R), green (G), and blue (B). The calibration data may be light emission intensities for RGB instead of the color system data.

Figure 3:
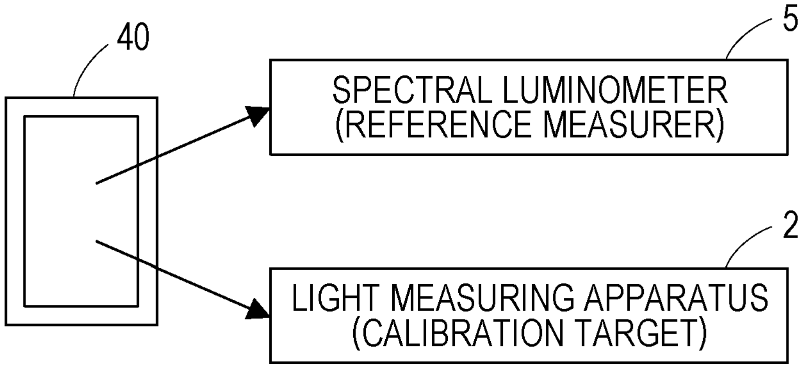
FIG. 3 is an explanatory diagram of user calibration.

As illustrated in FIG. 3, the user calibration is performed by, but not limited to, measuring light from a display (master display) 40 as a reference by using a spectral luminometer 5 as a reference and the light measuring apparatus 2 that performs calibration. Differences in measured values are corrected based on the user calibration data.

In the present embodiment, as the user calibration data, user calibration data corresponding to a plurality of gradations corresponding to a plurality of light emission modes of the display 4 is created for each of white (W), red (R), green (G), and blue (B) which are colors of light emitted by the display 4. The created user calibration data is stored in the user calibration data storage section 29*b*. The user calibration data may be created by the light measuring apparatus 2. Alternatively, the user calibration data created by the display inspection/adjustment apparatus 3 or another information processing apparatus may be stored in the user calibration data storage section 29*b* of the light measuring apparatus 2.

In the present embodiment, the light emission mode of the display 4 is specified based on at least one of a gamma curve, a light emission drive frequency of the measurement target, and a drive circuit (light emission circuit) of the measurement target, and a plurality of light emission modes are set based on different combinations of these.

As an example, user calibration data corresponding to different gamma curves will be described.

Figure 4A:
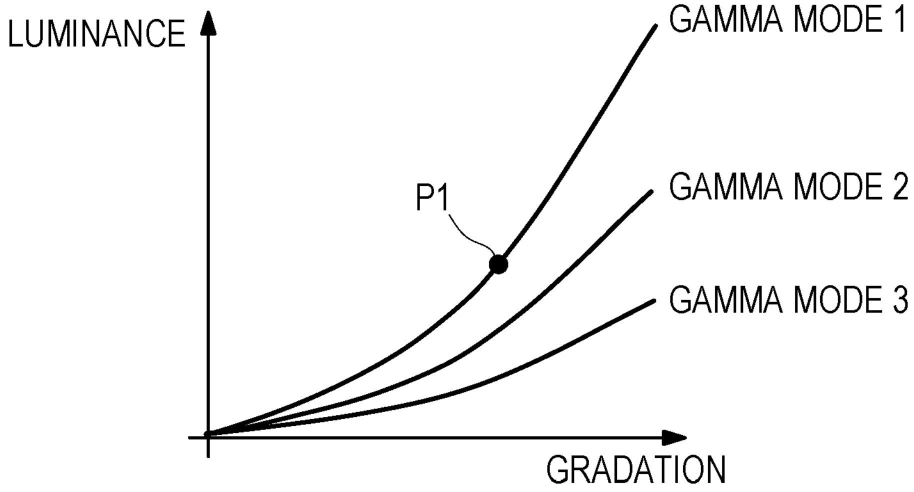
FIG. 4A is an explanatory diagram of calibration data by user calibration in the related art.
Figure 4B:
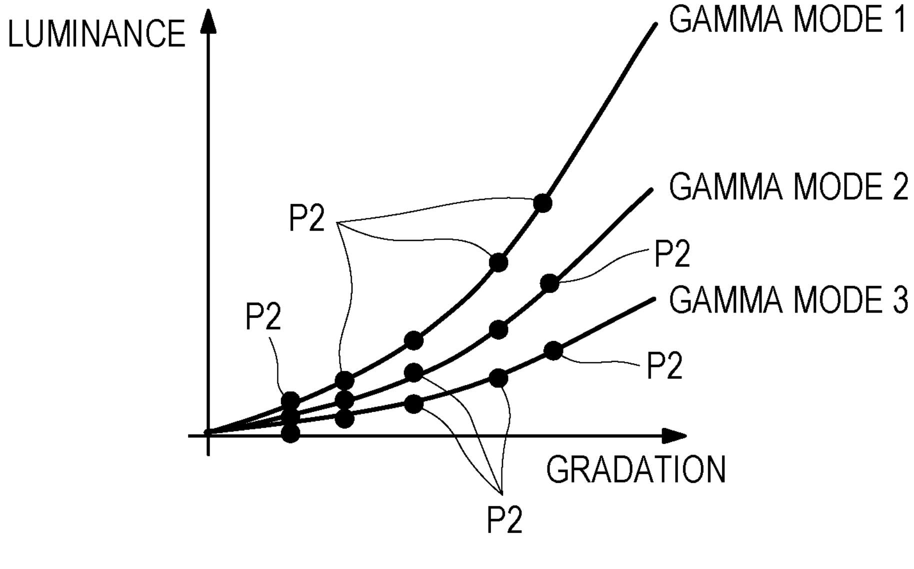
FIG. 4B is an explanatory diagram of calibration data by user calibration in the present embodiment.

As illustrated in FIG. 4A and FIG. 4B, it is assumed that three gamma curves of gamma modes 1 to 3 are set for the display 4 to be subjected to gamma adjustment at a certain light emission drive frequency (e.g., 60 Hz). In the related art, as illustrated in FIG. 4A, user calibration is performed only at one calibration point P1 at specific luminance in the gamma mode 1 to create calibration data, and the calibration data is applied to gamma adjustment for each gradation of the gamma modes 1 to 3.

However, in this case, when a gamma adjustment point and the calibration point are largely shifted from each other, a measurement error becomes large, sufficient measurement accuracy cannot be obtained, and the accuracy of the gamma adjustment is lowered.

Therefore, in the present embodiment, as illustrated in FIG. 4B, user calibration is performed for each of a plurality of gradations in the gamma mode 1. Further, the user calibration is performed for each of the plurality of gradations in all the other gamma modes 2 and 3, and calibration data is created at a plurality of calibration points P2.

Further, also in a case where one or a plurality of gamma modes are set at other light emission drive frequencies, user calibration is performed for each of the plurality of gradations for each gamma mode at each light emission drive frequency, and user calibration data is created at the plurality of calibration points P2.

Furthermore, if the drive circuit of the display 4 is different, the light emission state also changes. Therefore, the user calibration is performed for each gradation with a combination of the type of the drive circuit of the display 4, the type of the light emission drive frequency, and the type of the gamma mode, and user calibration data is created at the plurality of calibration points P2.

Factors involved in the light emission state of the display 4 include not only the gamma curve, the light emission drive frequency, and the drive circuit but also a cavity, a current value, a temperature, a lighting time, an outside air temperature, a production lot, and the like. A plurality of light emission modes may be set with a combination of one or more of these, and user calibration data corresponding to the plurality of gradations may be created for each of the light emission modes.

Furthermore, it is desirable that the calibration data not only correspond to the light emission mode but also be created in consideration of at least one of a measurement condition and an environment situation. Examples of the measurement condition include, for example, at least one of installation information of the light measuring apparatus 2, a measurement position with respect to the display 4, a lighting time, and the like. Examples of the installation information of the light measuring apparatus 2 include at least one of a measurement angle with respect to the display 4 and a distance between the display 4 and a lens. Examples of the environmental situation include at least one of temperature and humidity.

A specific example of the user calibration data will be described.

Specific Example 1

This example is an example in which a measurement result obtained when the master display 40 is measured by the spectral luminometer 5 serving as a reference and a measurement result obtained when the master display 40 is measured by the light measuring apparatus 2 as a calibration target are held as user calibration data. In this example, the user calibration data is prepared as a lookup table (LUT) for each drive frequency.

An upper diagram of FIG. 5 illustrates a lookup table for a drive frequency of 60 Hz. In this lookup table, four modes, a mode 1 (high luminance), a mode 2, a mode 3, and a mode 4 (low luminance) are set as gamma modes (described as a "gamma mode" in FIG. 5). For each mode, for each of white (W), red (R), green (G), and blue (B), a reference value that is a measurement result of the spectral luminometer 5 as a reference and a calibration target measured value that is a result of measurement by the light measuring apparatus 2 as a calibration target are described in "Lvxy".

A lower diagram of FIG. 5 illustrates a lookup table indicating specific data of reference values and calibration target measured values in the mode 1 (high luminance) indicated by a thick frame in the lookup table in the upper diagram of FIG. 5. The lookup table indicates data of measurement results for white (W), red (R), green (G), and blue (B) for each predetermined gradation (tone). Values of four colors, white (W), red (R), green (G), and blue (B), on the left side are the reference values, and values of four colors, white (W), red (R), green (G), and blue (B), on the right side are the calibration target measured values.

Although not illustrated, for each of the gamma modes that are the mode 2, the mode 3, and the mode 4, a lookup table indicating specific data of reference values and calibration target measured values is created and stored, as in the lower diagram of FIG. 5.

Furthermore, the lookup tables illustrated in the upper and lower diagrams of FIG. 5 are also stored for light emission drive frequencies other than 60 Hz.

That is, the lookup tables as illustrated in the upper and lower diagrams of FIG. 5 are stored for each of the different light emission modes. [Specific Example 2]

This example is an example in which matrix calibration coefficients calculated from a result of measurement by the spectral luminometer 5 serving as a reference and a result of measurement by the light measuring apparatus 2 as a calibration target are held as calibration data. The calibration data is prepared as a lookup table for each drive frequency.

An upper diagram of FIG. 6 illustrates a lookup table for a drive frequency of 60 Hz, and four modes, mode 1 (high luminance), mode 2, mode 3, and mode 4 (low luminance), are set as gamma modes. For each gamma mode, reference measured values for white (W), red (R), green (G), and blue (B) are all described as "Lvxy". Further. "matrix" which indicates the matrix calibration coefficients is described as user calibration data.

A lower diagram of FIG. 6 illustrates a lookup table indicating specific data in the mode 1 (high luminance) indicated by a thick frame in the lookup table in the upper diagram of FIG. 6. In the lookup table, data of reference measured values for white (W), red (R), green (G), and blue (B) are indicated for each predetermined gradation (tone). In addition, specific matrix calibration coefficients are indicated as user calibration coefficients (coefficients for calibrating differences from a reference measurer).

Although not illustrated, specific matrix calibration coefficients similar to those illustrated in the lower diagram of FIG. 6 are also created and stored for the respective gamma modes, which are the mode 2, the mode 3, and the mode 4.

Furthermore, the lookup tables illustrated in the upper and lower diagrams of FIG. 6 are also stored for light emission drive frequencies other than 60 Hz.

That is, the lookup tables as illustrated in the upper and lower diagrams of FIG. 6 are stored for each of the different light emission modes.

In Specific Example 1, the luminance measured by the light measuring apparatus 2 is corrected by using the data of the reference measured values and the calibration target measured values that are the user calibration data. In Specific Example 2, the luminance measured by the light measuring apparatus 2 is corrected using the matrix calibration coefficients which are the user calibration data.

To correct the measured values using calibration data out of the stored user calibration data, the user may select calibration data corresponding to the light emission state of the display 4, for example, data corresponding to the light emission drive frequency or the gamma mode. Preferably, the following is preferable. That is, the light measuring apparatus 2 inputs a light emission mode signal indicating the light emission state from the display inspection/adjustment apparatus 3 via the external interface 18 and the data input/output section 27*e*. Then, it is preferable that the CPU 27 automatically select corresponding user calibration data based on the light emission mode signal. When the user tries to make a selection in accordance with a gamma adjustment condition, it is necessary to select user calibration data for each gamma adjustment condition. For this reason, it takes time to construct and verify the system, and a setting error is also induced. Therefore, to avoid such a problem, it is preferable that the light measuring apparatus 2 automatically select user calibration data based on the light emission mode signal.

In addition, the user calibration data used and the result of the correction may be output to the display inspection/adjustment apparatus 3 and stored as a history in a storage section of the display inspection/adjustment apparatus 3. Thus, the display inspection/adjustment apparatus 3 can grasp and manage the content of the correction by the light measuring apparatus 2 and the user calibration data used. In addition, it is desirable to store at least one of a measurement condition and an environmental situation together. Examples of the measurement condition include, for example, at least one of installation information of the light measuring apparatus 2, a measurement position with respect to the display 4, a lighting time, and the like. Examples of the installation information of the light measuring apparatus 2 include at least one of a measurement angle with respect to the display 4 and a distance between the display 4 and the lens. Examples of the environmental situation include at least one of temperature and humidity.

In the embodiment described above, the factory calibration data and the user calibration data are stored in the light measuring apparatus 2. In addition, the display inspection/adjustment apparatus 3 or another information processing apparatus may store and manage all of the factory calibration data and the user calibration data, and the information processing apparatus or the like may transmit the minimum necessary calibration data corresponding to the light emission mode signal of the display to the light measuring apparatus 2.

Alternatively, the display inspection/adjustment apparatus 3 or another information processing apparatus that stores the factory calibration data and the user calibration data may receive a result of receiving light from the display 4 from the light measuring apparatus 2, select calibration data corresponding to the light emission mode of the display 4, and correct the measurement result using the selected calibration data.

Furthermore, luminance information may be determined based on an output value of the A/D conversion circuit 26 measured by the light measuring apparatus 2 itself. That is. Lv is calculated for the output value of the A/D conversion circuit 26 by using the factory calibration data set based on the reference light source, and when the user calibration data is selected, the output Lv is acquired by adding the calibration data to the calculated Lv.

Next, the gamma adjustment of the display 4 by the display inspection/adjustment system 1 illustrated in FIG. 1 will be described.

During the gamma adjustment, the display inspection/adjustment apparatus 3 controls the light emission state of the display 4, and performs the gamma adjustment based on the result of luminance measurement by the light measuring apparatus 2 corrected by the calibration data. As illustrated in FIG. 1, the display inspection/adjustment apparatus 3 includes a light emission drive signal output section 31 and a gamma (indicated by "y" in FIG. 1) adjuster 32.

The light emission drive signal output section 31 outputs, to the display 4, a pulsed light emission drive signal for driving the display 4 to emit light when the luminance of the display 4 is to be measured by the light measuring apparatus 2. Specifically, the light emission drive signal output section 31 matches the frequency (the light emission drive frequency of the display 4), the shape, and the like of the light emission drive signal to be generated with those planned by the manufacturer of the display 4, and supplies the light emission drive signal to the display 4.

The gamma adjuster 32 performs the gamma adjustment of the display 4, which will be described later.

The display inspection/adjustment apparatus 3 includes a CPU as a processor, a RAM as a memory, and a programmable logic controller (PLC) including a storage device such as a hard disk or an SSD. Functions of the light emission drive signal output section 31, the gamma adjuster 32, and the like are executed by the CPU operating in accordance with an operation program stored in the storage device and loaded into the RAM.

Figure 7:
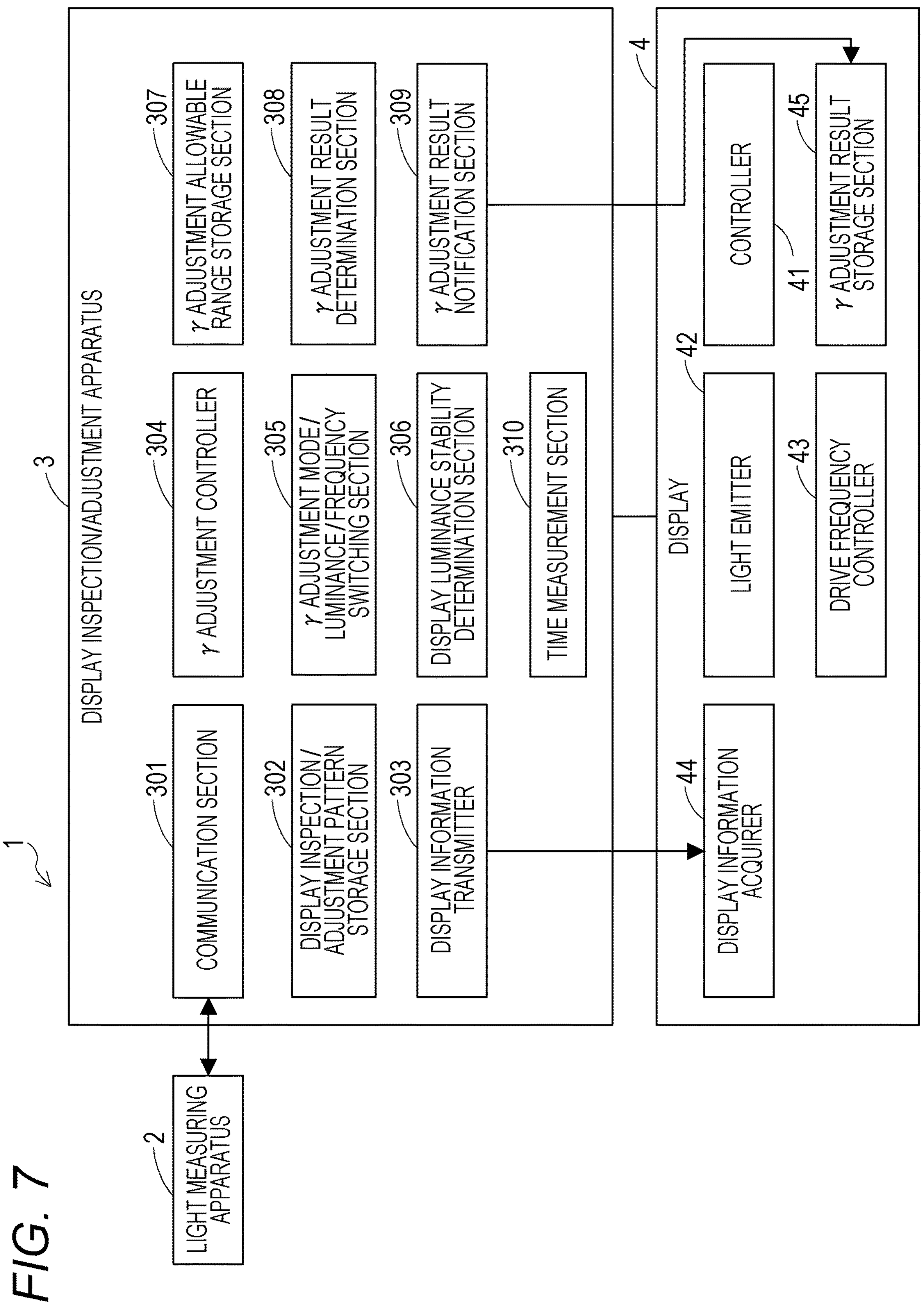
FIG. 7 is a block diagram illustrating specific configurations of a display inspection/adjustment apparatus and a display.

FIG. 7 is a block diagram illustrating specific configurations of the display inspection/adjustment apparatus 3 and the display 4.

The display inspection/adjustment apparatus 3 includes a communication section 301, a display inspection/adjustment pattern storage section 302, a display information transmitter 303, a gamma adjustment controller 304, and a gamma adjustment mode/luminance/frequency switching section 305. The display inspection/adjustment apparatus 3 further includes a display luminance stability determination section 306, a gamma adjustment allowable range storage section 307, a gamma adjustment result determination section 308, a gamma adjustment result notification section 309, and a time measurement section 310.

The communication section 301 functions as an interface for transmitting and receiving data to and from the light measuring apparatus 2.

The display inspection/adjustment pattern storage section 302 stores a pattern of the light emission drive signal for the display 4, and stores a pattern for each customer. The pattern of the light emission drive signal also includes a relational expression (ideal curve) of an input signal (voltage value) to the display 4 and output luminance. In gamma adjustment processing, the relationship of the output luminance with respect to the input signal is reset so as to correct a difference between the output luminance for the input voltage value and the ideal curve.

The display information transmitter 303 transmits information to be displayed on the display 4 to the display 4. The light emission drive signal output section 31 illustrated in FIG. 1 includes the display inspection/adjustment pattern storage section 302, the display information transmitter 303, and the like.

The gamma adjustment controller 304 controls the gamma adjustment processing. The gamma adjustment mode/luminance/frequency switching section 305 switches the gamma adjustment mode, the luminance, and the frequency.

The display luminance stability determination section 306 determines whether or not the luminance of the display 4 is stable during the gamma adjustment, and the gamma adjustment is performed in a stable state. The gamma adjustment allowable range storage section 307 stores an allowable range of the gamma adjustment, for example, for each customer or for each display 4.

The gamma adjustment result determination section 308 determines a result of the gamma adjustment. The gamma adjustment result notification section 309 notifies the display 4 of the result of the gamma adjustment. The result of the gamma adjustment is, for example, a relationship (expression, a lookup table, or the like) of the output luminance with respect to the reset input signal, a correction coefficient for a relational expression between an input signal (a voltage value) to the display and the output luminance stored in the display inspection/adjustment pattern storage section 202, or the like. The time measurement section 310 measures time during the gamma adjustment or the like.

The gamma adjustment controller 304, the gamma adjustment mode/luminance/frequency switching section 305, the display luminance stability determination section 306, the gamma adjustment allowable range storage section 307, the gamma adjustment result determination section 308, the gamma adjustment result notification section 309, the time measurement section 310, and the like described above constitute the gamma adjuster 32 illustrated in FIG. 1.

The display 4 includes a controller 41, a light emitter 42, a drive frequency controller 43, a display information acquirer 44, a gamma adjustment result storage section 45, and the like.

The controller 41 comprehensively controls the entire display 4. The light emitter 42 includes a light emitting element such as an LED. The drive frequency controller 43 controls driving of the light emitter 42 so as to cause the light emitter 42 to emit light at the light emission drive frequency output from the display inspection/adjustment apparatus 3.

The display information acquirer 44 acquires information transmitted from the display information transmitter 303 of the display inspection/adjustment apparatus 3 and to be displayed on the display 4. The gamma adjustment result storage section 45 stores the gamma adjustment result notified from the gamma adjustment result notification section 309 of the display inspection/adjustment apparatus 3.

In the present embodiment, as described above, the light measuring apparatus 2 corrects the measured luminance using the user calibration data. The user calibration data is created at a plurality of calibration points corresponding to the plurality of gradations corresponding to the plurality of light emission modes of the display 4 for each color of light emitted from the display 4. It is desirable that calibration data corresponding to all of the plurality of adjustment points in the gamma adjustment processing be created. However, since it is necessary to prepare a large number of pieces of user calibration data, it takes time to create the user calibration data, which is difficult in practice.

Therefore, based on the light emission mode signal input from the display inspection/adjustment apparatus 3, the measured values are corrected using user calibration data of a calibration point close to the gamma adjustment point. However, the accuracy of the correction decreases as the distance from the gamma adjustment point increases.

Therefore, interpolation is performed based on the user calibration data stored in the memory such that the user calibration data is suitable for the light emission mode (gamma adjustment point). Then, the measured values may be corrected by using the interpolated new calibration data. For example, an interpolation calculation process is performed using user calibration data of a plurality of calibration points, and new calibration data is created as calibration data between two calibration points by computation. As described above, new calibration data is created by computation using the user calibration data created based on the actual measurement. Accordingly, even in a case where the number of pieces of the user calibration data to be stored is small, it is possible to create the user calibration data suitable for the light emission mode.

Figure 8:
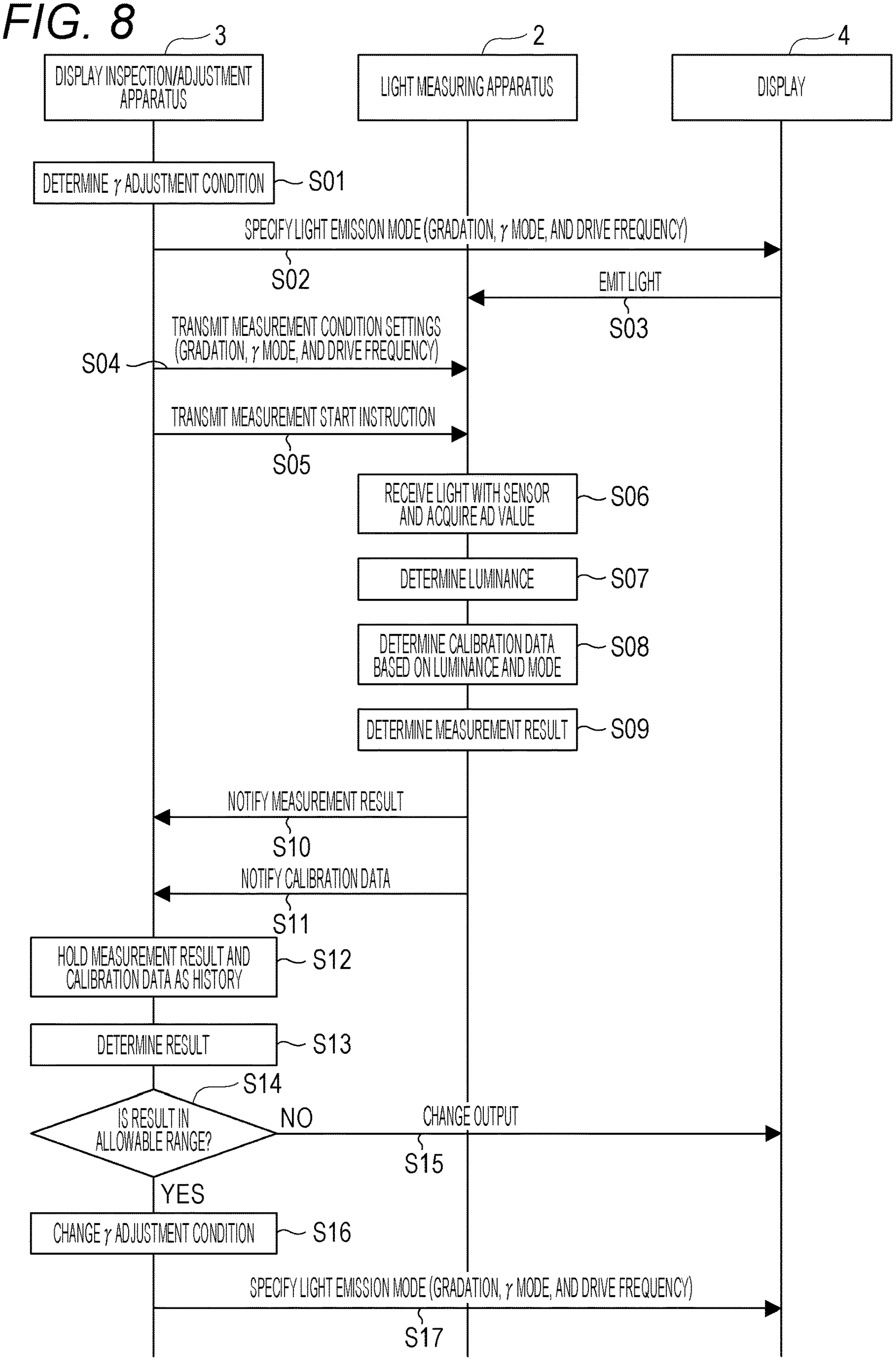
FIG. 8 is a sequence diagram illustrating an outline of gamma adjustment processing.

FIG. 8 is a sequence diagram illustrating an outline of the gamma adjustment processing.

After determining a gamma adjustment condition (step S01), the display inspection/adjustment apparatus 3 specifies a light emission mode including a gradation, a gamma mode, and a drive frequency corresponding to the determined gamma adjustment condition to the display 4 (step S02). The display 4 that has received the specifying emits light in the specified light emission mode (step S03).

Meanwhile, the display inspection/adjustment apparatus 3 transmits, to the light measuring apparatus 2, measurement condition settings including the gradation, the gamma mode, and the drive frequency, in other words, a signal indicating the light emission mode specified for the display 4 (step S04). The display inspection/adjustment apparatus 3 further transmits a measurement start instruction (step S05). Note that the measurement condition settings and the measurement start instruction may be transmitted separately or at the same time.

The light measuring apparatus 2 that has received the measurement condition settings and the measurement start instruction measures the luminance of the display 4. To be specific, the light measuring apparatus 2 receives the light with the light receiving sensor 20, acquires an AD value that is an output value of the A/D conversion circuit 26 (step S06), and then determines the luminance (step S07).

Next, the light measuring apparatus 2 determines user calibration data to be used out of a large amount of user calibration data stored in the user calibration data storage section 29*b* (step S08). The user calibration data is basically determined based on the light emission mode signal. Based on the luminance (actual light intensity signal), the user calibration data having luminance closest to the actual light intensity signal may be determined as calibration data to be used. This is because, if the measurement result corrected using the user calibration data is out of the appropriate range of the gamma adjustment, since the output adjustment of the display 4 is performed again, the measurement result is finally adjusted without any problem so as to fall within the appropriate range.

When no calibration data close to the gamma adjustment point is present, new calibration data may be created by interpolating the calibration data. The interpolation method in this case may be the above-described method, but the interpolation may be performed based on the actual light intensity signal. For example, user calibration data having intermediate luminance may be created from two pieces of user calibration data each having luminance closest to the actual light intensity signal, and the luminance may be corrected using the interpolated user calibration data.

After determining the user calibration data to be used, the light measuring apparatus 2 corrects the measured value using the user calibration data, and determines the measurement result (step S09). The light measuring apparatus 2 notifies the display inspection/adjustment apparatus 3 of the measurement result after the correction (step S10). The light measuring apparatus 2 also notifies the display inspection/adjustment apparatus 3 of the user calibration data used (step S11). Based on an acquisition request from the display inspection/adjustment apparatus 3, the light measuring apparatus 2 may notify the display inspection/adjustment apparatus 3 of the user calibration data.

The display inspection/adjustment apparatus 3 holds the notified measurement result and the calibration data as a history (step S12). Furthermore, the display inspection/adjustment apparatus 3 performs a suitability determination on the measurement result (step S13), and examines whether or not the measurement result is within an allowable range (step S14). When the measurement result is not within the allowable range (NO in step S14), the display inspection/adjustment apparatus 3 instructs the display 4 to change the output (step S15). In this case, the display 4 emits light with the changed output, and the light emission, the measurement, the result determination, and the output change instruction are repeated until the measurement result is determined to be within the allowable range.

When the measurement result is within the allowable range (YES in step S14), the display inspection/adjustment apparatus 3 changes the gamma adjustment condition to the next gamma adjustment condition (step S16). Thereafter, the display inspection/adjustment apparatus 3 specifies, for the display 4, a light emission mode corresponding to the gamma adjustment condition (step S17). Thereafter, these processes are repeated until the gamma adjustment is completed.

Figure 9A:
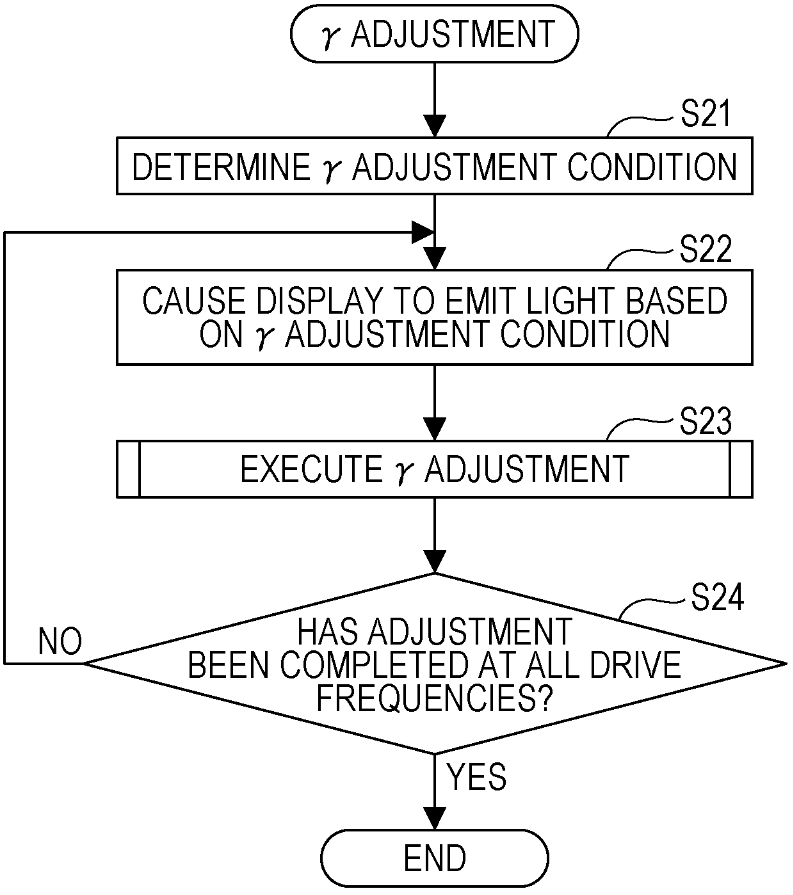
FIG. 9A is a flowchart illustrating a gamma adjustment processing operation of the display inspection/adjustment apparatus.

FIG. 9A is a flowchart illustrating a gamma adjustment processing operation of the display inspection/adjustment apparatus 3.

The display inspection/adjustment apparatus 3 determines a gamma adjustment condition in step S21, then causes the display to emit light based on the determined gamma adjustment condition in step S22, and executes the gamma adjustment in step S23. The execution of the gamma adjustment will be described later.

Next, in step S24, the display inspection/adjustment apparatus 3 determines whether or not the gamma adjustment was completed at all drive frequencies. When the gamma adjustment is not completed (NO in step S24), the process returns to step S22, and the display inspection/adjustment apparatus 3 changes the gamma adjustment condition and repeats the execution of the gamma adjustment and the completion determination until the gamma adjustment is completed. When the gamma adjustment is completed (YES in step S24), the process is ended.

Figure 9B:
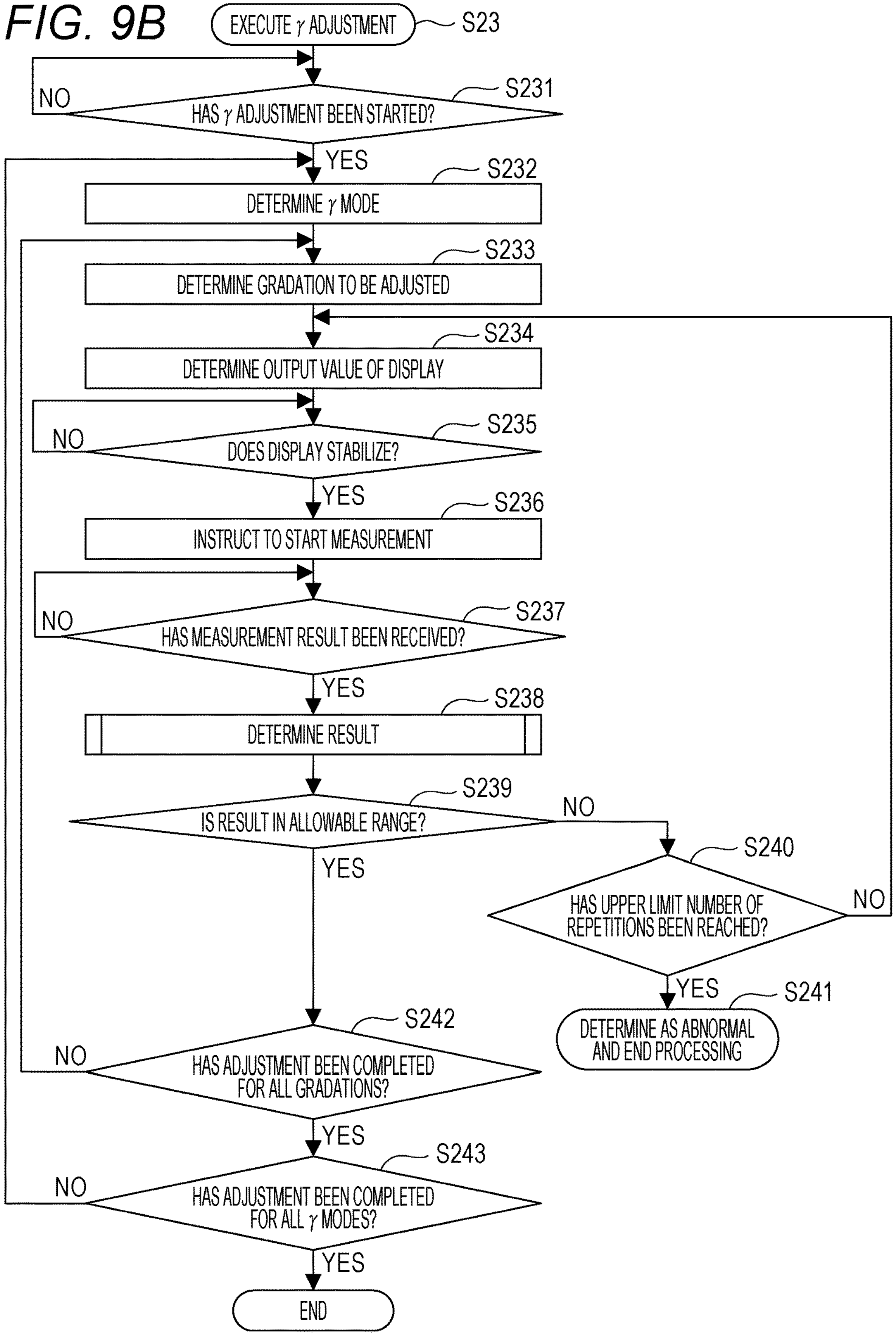
FIG. 9B is a flowchart illustrating the content of gamma adjustment execution processing in step S23 in FIG. 9A.

FIG. 9B is a flowchart illustrating the content of gamma adjustment execution processing in step S23 in FIG. 9A.

The display inspection/adjustment apparatus 3 waits for the start of the gamma adjustment in step S231 (NO in step S231), and when the gamma adjustment is started (YES in step S231), the display inspection/adjustment apparatus 3 determines a gamma mode in step S232.

Next, the display inspection/adjustment apparatus 3 determines a gradation to be subjected to the gamma adjustment in step S233, then determines an output value of the display 4 in step S234, and waits for display of the display 4 to stabilize in step S235 (NO in step S235). When the display is stabilized (YES in Step S235), the display inspection/adjustment apparatus 3 instructs the light measuring apparatus 2 to start the measurement in step S236, and then waits for a notification of a result of the measurement from the light measuring apparatus 2 in step S237 (NO in Step S237). When the notification of the measurement result is provided (YES in step S237), the display inspection/adjustment apparatus 3 performs result determination processing in step S238. The result determination processing will be described later.

Next, in step S239, the display inspection/adjustment apparatus 3 checks whether or not the measurement result is within the allowable range. When the measurement result is not within the allowable range (NO in step S239), the display inspection/adjustment apparatus 3 checks in step S240 whether or not a preset upper limit number of repetitions was reached. When the upper limit number reached (YES in step S240), the display inspection/adjustment apparatus 3 determines it as abnormal and ends the processing. When the upper limit number is not reached (NO in step S240), the processing returns to step S234, and the display inspection/adjustment apparatus 3 determines a new display output value and repeats the processing in step S235 and subsequent steps.

When the measured value is within the allowable range in step S239 (YES in Step S239), the display inspection/adjustment apparatus 3 checks whether or not the gamma adjustment was completed for all gradations in step S242. When the gamma adjustment is not completed (NO in step S242), the processing returns to step S233, the display inspection/adjustment apparatus 3 determines the next gradation, and repeats the processing in step S234 and subsequent steps. When the gamma adjustment is completed for all the gradations (YES in step S242), the processing proceeds to step S243.

In step S243, the display inspection/adjustment apparatus 3 checks whether or not the gamma adjustment was completed for all the gamma modes. When the gamma adjustment is not completed (NO in step S243), the processing returns to step S232, the display inspection/adjustment apparatus 3 determines the next gamma mode, and repeats the processing in step S233 and subsequent steps.

When the gamma adjustment is completed for all the gamma modes in step S243 (YES in step S243), the display inspection/adjustment apparatus 3 ends the gamma adjustment execution processing.

Figure 9C:
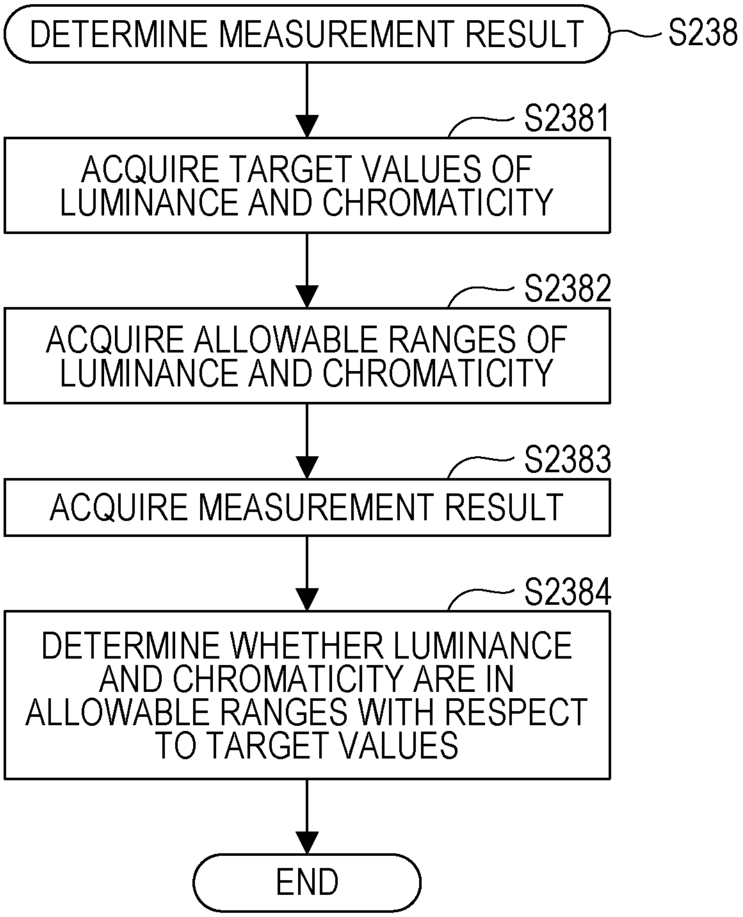
FIG. 9C is a flowchart illustrating the content of result determination processing in step S238 in FIG. 9B.

FIG. 9C is a flowchart illustrating the content of result determination processing in step S238 in FIG. 9B.

In step S2381, luminance and chromaticity target values are obtained, and in step S2382, allowable ranges of luminance and chromaticity are obtained. Next, after the measurement result is acquired in step S2383, it is determined in step S2384 whether or not the luminance and the chromaticity are within the allowable ranges with respect to the target values, and the result determination processing is ended.

Figure 10A:
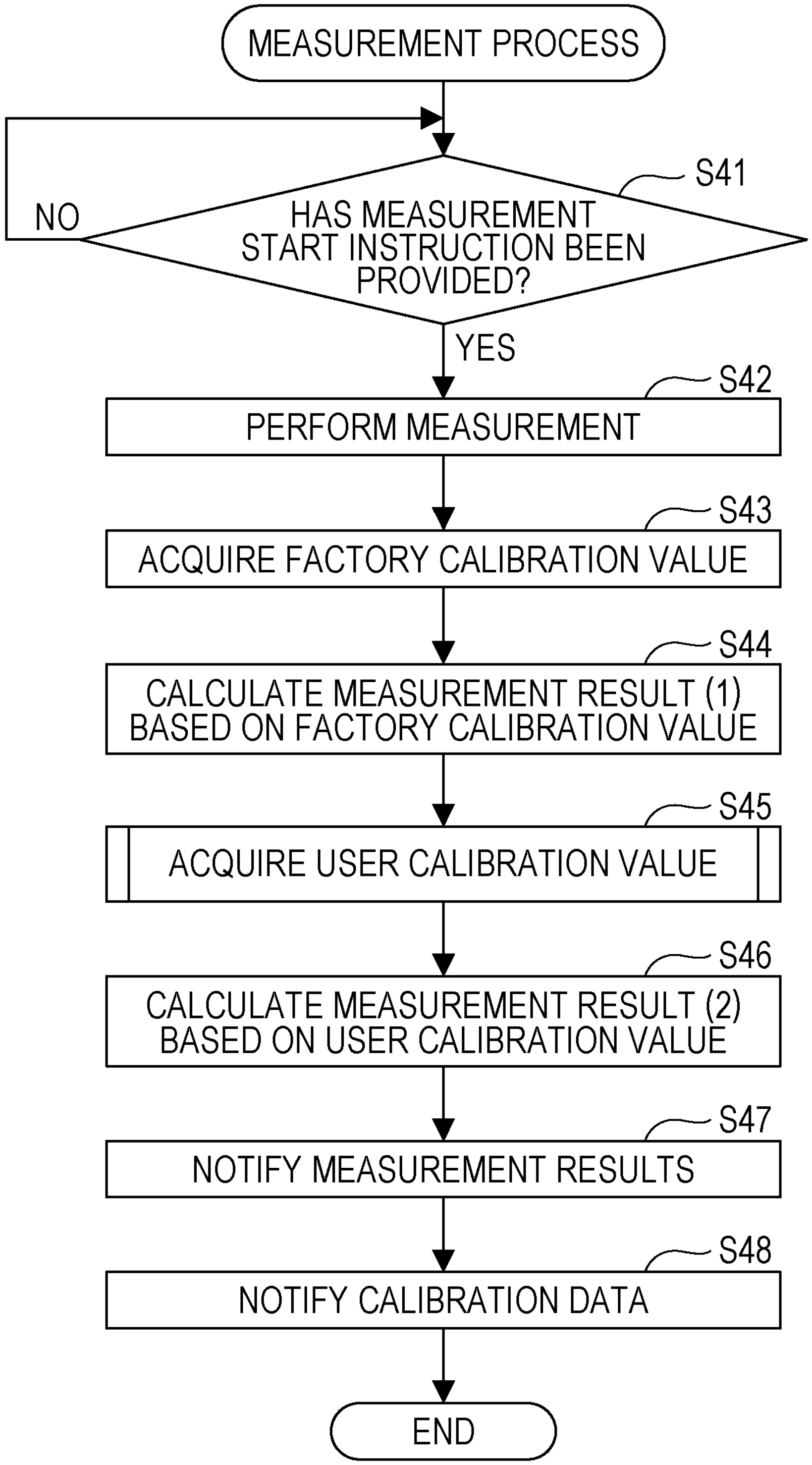
FIG. 10A is a flowchart illustrating a measurement operation of the light measuring apparatus during gamma adjustment.

FIG. 10A is a flowchart illustrating a measurement operation of the light measuring apparatus 2 during the gamma adjustment.

In step S41, the light measuring apparatus 2 waits for a measurement start instruction from the display inspection/adjustment apparatus 3 (NO in step S41), and performs the measurement in step S42 when the measurement start instruction is provided (YES in step S41). Next, in step S43, the light measuring apparatus 2 acquires the factory calibration data (factory calibration value), and performs correction based on the factory calibration value and calculates a measurement result (1) in step S44.

Next, in step S45, the light measuring apparatus 2 acquires user calibration data (user calibration value), and then performs correction based on the user calibration value and calculates a measurement result (2) in step S46.

Next, in step S47, the light measuring apparatus 2 notifies the display inspection/adjustment apparatus 3 of the measurement results, then notifies the display inspection/adjustment apparatus 3 of the used user calibration value in step S48, and ends the measurement processing.

Figure 10B:
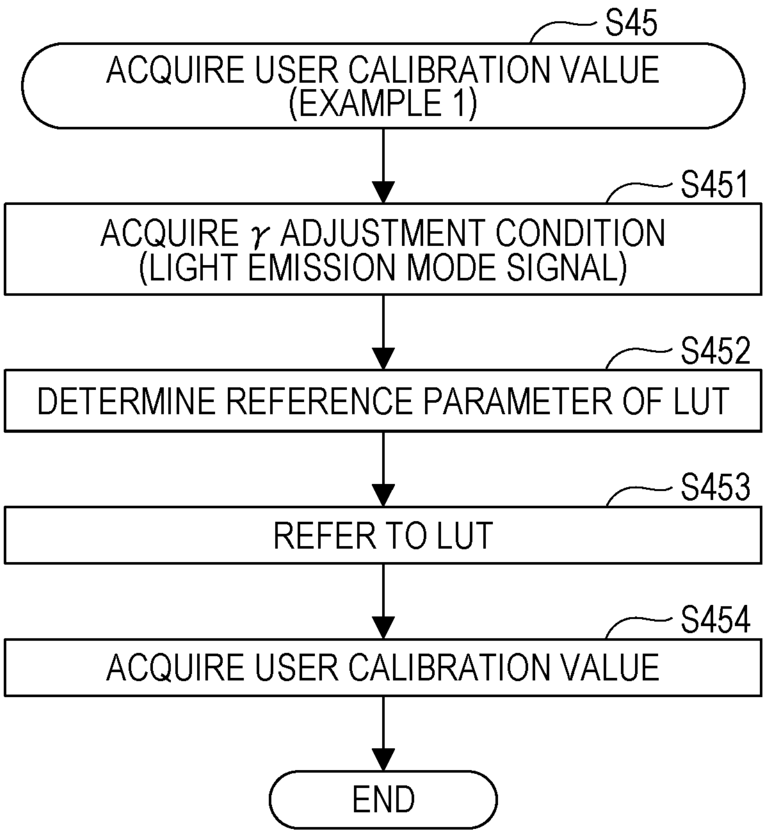
FIG. 10B is a flowchart illustrating an example of user calibration data acquisition processing in step S45 in FIG. 10A.

FIG. 10B is a flowchart illustrating an example of user calibration data acquisition processing in step S45 in FIG. 10A.

In step S451, the light measuring apparatus 2 acquires a gamma adjustment condition, that is, a light emission mode signal from the display inspection/adjustment apparatus 3. Next, the light measuring apparatus 2 determines, based on the light emission mode signal, a reference parameter of a lookup table in which calibration data is defined in step S452, refers to the lookup table based on the reference parameter in step S453, acquires a user calibration value in step S454, and ends the processing.

Figure 10C:
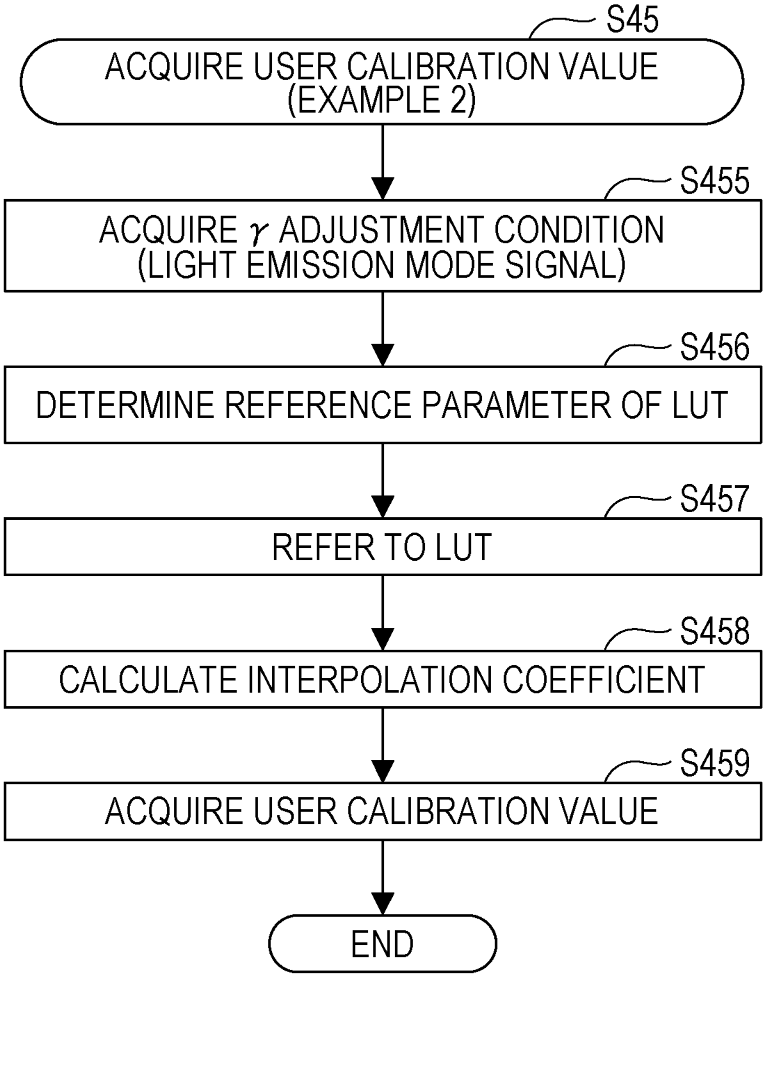
FIG. 10C is a flowchart illustrating another example of the user calibration data acquisition processing in step S45 in FIG. 10A.

FIG. 10C is a flowchart illustrating another example of the user calibration value acquisition processing in step S45 in FIG. 10A. In this example, a new user calibration value is converted and created by using a plurality of user calibration values.

In step S455, the light measuring apparatus 2 acquires a gamma adjustment condition, that is, a light emission mode signal from the display inspection/adjustment apparatus 3. Next, the light measuring apparatus 2 determines, based on the light emission mode signal, a reference parameter of the lookup table in which the calibration data is defined in step S456, and then refers to the lookup table based on the reference parameter in step S457.

Next, after calculating the interpolation coefficient in step S458, the light measuring apparatus 2 combines the existing user calibration value and the interpolation coefficient, converts the existing user calibration value and the interpolation coefficient into a new user calibration value and obtains the new user calibration value in step S459, and ends the processing.

As described above, in the present embodiment, the calibration data according to the plurality of gradations corresponding to the plurality of light emission modes of the display 4 is stored in a storage section such as the memory 29 in advance for each color of light emitted from the display 4. Then, measured values indicating the luminance and the like of the light received by the light receiving sensor 20 are calculated using a light intensity signal from the display 4 received by the light receiving sensor 20 of the light measuring apparatus 2 and the calibration data corresponding to the light emission state of the display 4. Therefore, even in a case where the display 4 can emit light in different colors in different light emission modes, calibration data corresponding to the light emission conditions or calibration data close to the light emission conditions can be used. Therefore, it is possible to select and use appropriate calibration data as compared with a case where only calibration data for luminance at a specific panel drive frequency is used or a case where calibration data based on gradation information is used as in the conventional art. As a result, the measurement target parameters such as the luminance and the chromaticity can be calibrated with high accuracy with a small error regardless of different light emission conditions, and thus the gamma adjustment can be performed with high accuracy.

Further, in the case of gamma adjustment in a low luminance region, since a measurement result tends to vary because the amount of light is small at low luminance, output adjustment is repeated in the related art. In the present embodiment, since the measurement can be performed with high accuracy by using appropriate calibration data even in a low luminance region, it is not necessary to repeat the measurement as compared with the related art, and the adjustment can be performed in a short time.

The one embodiment of the present invention has been described above, but the present invention is not limited to the above-described embodiment.

For example, the display inspection/adjustment apparatus 3 performs the gamma adjustment, but the light measuring apparatus 2 may have a built-in gamma adjustment function.

Although one or more embodiments of the present invention have been described and illustrated in detail, the disclosed embodiments are made for purposes of illustration and example only and not limitation. The scope of the present invention should be interpreted by terms of the appended claims.

What is claimed is:

1. A light measuring apparatus comprising:

a light receiver that receives light from a measurement target capable of emitting light;

a memory that stores in advance calibration data corresponding to a respective one of a plurality of gradations for each of corresponding a plurality of light emission modes of the measurement target for each color of light emitted from the measurement target; and a hardware processor that calculates light emission information including luminance and/or color information of the light from the measurement target derived from a light intensity signal of the light received by the light receiver;

wherein the hardware processor corrects an initial value related to the light emission information derived from the light intensity signal using the calibration data to calculate the light emission information.

2. The light measuring apparatus according to claim 1, wherein the plurality of light emission modes are different in at least one of a gamma curve, a light emission drive frequency of the measurement target, and a drive circuit of the measurement target.

3. The light measuring apparatus according to claim 1, wherein the calibration data is based on at least one of a measurement condition and an environment situation.

4. The light measuring apparatus according to claim 1, wherein a light emission mode signal indicating the light emission state of the measurement target is input to the hardware processor, and the hardware processor selects the calibration data based on the input light emission mode signal.

5. The light measuring apparatus according to claim 1, wherein the hardware processor selects the calibration data based on an actual light intensity signal of light received by the light receiver.

6. The light measuring apparatus according to claim 1, wherein a light emission mode signal indicating the light emission state of the measurement target is input to the hardware processor, and the hardware processor calculates the light emission information using calibration data interpolated so as to be suitable for the input light emission mode signal based on the calibration data stored in the memory.

7. The light measuring apparatus according to claim 1, wherein the hardware processor interpolates the calibration data stored in the memory based on an actual light intensity signal of light received by the light receiver, and calculates the light emission information using the interpolated calibration data.

8. The light measuring apparatus according to claim 1, further comprising an interface that outputs calibration data information regarding the calibration data used for the calculation of the light emission information to an external apparatus.

9. The light measuring apparatus according to claim 1, wherein the memory further stores a factory calibration data set based on a reference light source in a factory, the hardware processor corrects the initial value using the factory calibration data and the calibration data to calculate the light emission information.

10. The light measuring apparatus according to claim 1, wherein the light receiver includes an X color filter, a Y color filter, a Z color filter, and photosensors that receive light transmitted through the X, Y, and Z color filters respectively.

11. The light measuring apparatus according to claim 1, wherein the hardware processor corrects the luminance, the chromaticity, or each value of XYZ derived from the light intensity signal using the calibration data to calculate the light emission information.

12. The light measuring apparatus according to claim 1, wherein the calibration data is set to compensate for the difference between a measured value of a reference light measuring apparatus and a measured value of the light measuring apparatus with respect to the light from the reference measurement object.

13. A display adjustment system for performing gamma adjustment of a display using a light emitter of the display as a measurement target, the display adjustment system comprising:

the light measuring apparatus according to claim 1;

light emission drive signal output section that causes the display to display panel display information for the gamma adjustment;

a gamma adjustment controller that performs the gamma adjustment based on light emission information calculated by the hardware processor using calibration data corresponding to the panel display information; and a gamma adjustment result notification section that notifies the display of a result of the gamma adjustment by the gamma adjustment controller.

14. A light measuring system comprising:

a light receiver that receives light from a measurement target capable of emitting light; and an information processing apparatus, wherein the information processing apparatus includes a memory that stores in advance calibration data corresponding to a respective one of a plurality of gradations for each of a plurality of light emission modes of the measurement target for each color of light emitted from the measurement target, and a hardware processor that calculates light emission information including luminance and/or color information of the light from the measurement target derived from a light intensity signal of light received by the light receiver, wherein the hardware processor corrects an initial value related to the light emission information derived from the light intensity signal using the calibration data to calculate the light emission information.

15. The light measuring system according to claim 14, wherein the plurality of light emission modes are different in at least one of a gamma curve, a light emission drive frequency of the measurement target, and a drive circuit of the measurement target.

16. The light measuring system according to claim 14, wherein a light emission mode signal indicating the light emission state of the measurement target is input to the hardware processor, and the hardware processor selects the calibration data based on the input light emission mode signal.

17. The light measuring system according to claim 14, wherein the hardware processor selects the calibration data based on an actual light intensity signal.

18. The light measuring system according to claim 14, wherein a light emission mode signal indicating the light emission state of the measurement target is input to the hardware processor, and the hardware processor calculates the light emission information using calibration data interpolated so as to be suitable for the input light emission mode signal based on the calibration data stored in the memory.

19. The light measuring system according to claim 14, wherein the hardware processor interpolates the calibration data stored in the memory based on an actual light intensity signal, and calculates the light emission information using the interpolated calibration data.

20. The light measuring system according to claim 14, further comprising a storage that stores the light emission information calculated by the hardware processor and the calibration data used for the calculation of the light emission information.

21. The light measuring system according to claim 20, wherein the storage further stores at least any one of a measurement condition or an environmental situation.

22. A light measurement method comprising:

receiving light by a light receiver from a measurement target capable of emitting light;

storing in advance calibration data corresponding to a plurality of gradations corresponding to a plurality of light emission modes of the measurement target in a memory for each color of light emitted from the measurement target; and calculating light emission information including luminance and/or color information of the light from the measurement target and calibration data corresponding to a light emission state of the measurement target.

23. The light measurement method according to claim 22, wherein the plurality of light emission modes are different in at least one of a gamma curve, a light emission drive frequency of the measurement target, and a drive circuit of the measurement target.

24. The light measurement method according to claim 22, wherein a light emission mode signal indicating the light emission state of the measurement target is input, and the calibration data is selected based on the input light emission mode signal.

25. The light measurement method according to claim 22, wherein the calibration data is selected based on an actual light intensity signal.

26. The light measurement method according to claim 22, wherein a light emission mode signal indicating the light emission state of the measurement target is input, and the light emission information is calculated using conversion calibration data obtained by conversion using the calibration data stored in the memory so as to be suitable for the input light emission mode signal.

27. The light measurement method according to claim 22, wherein calibration data information regarding the calibration data used for the calculation of the light emission information is output.

28. A display adjustment method for performing gamma adjustment of a display using a light emitter of the display as a measurement target, the display adjustment method comprising:

displaying panel display information for the gamma adjustment on the display;

performing the gamma adjustment based on the light emission information calculated in claim 22 using calibration data corresponding to the panel display information; and notifying the display of a result of the gamma adjustment.

29. The light measuring method according to claim 22, wherein the light emission information of the measurement target is calculated by correcting the initial value based on the calibration data and factory calibration data set based on a reference light source in a factory.

* * * * *